United States Patent Office 3,453,286
Patented July 1, 1969

3,453,286
PROCESS FOR PREPARING CYCLO-
HEPTIMIDAZOLINIUM HALIDES
Genshun Sunagawa, Nobuo Soma, and Junichi Nakazawa,
Tokyo, Japan, assignors to Sankyo Company Limited,
Tokyo, Japan
No Drawing. Filed July 13, 1966, Ser. No. 564,763
Claims priority, application Japan, July 19, 1965,
40/43,528
Int. Cl. C07d 49/34; A61k 27/00
U.S. Cl. 260—309.6                                    6 Claims

ABSTRACT OF THE DISCLOSURE

Process for the preparation of cycloheptimidazolinium derivatives having hypotensive or antiparasitic activities. Troponeimine derivatives are reacted with halogenoformic acid ester.

SUMMARY OF THE INVENTION

This invention relates to a novel and improved process for the preparation of cycloheptimidazolinium halides.

More particularly, this invention relates to a novel and improved process for the preparation of cycloheptimidazolinium halides having the formula

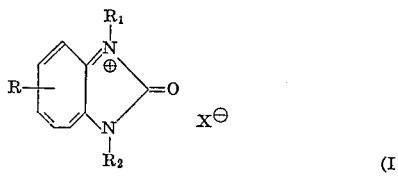

(I)

wherein R represents hydrogen, phenyl, halogen such as chlorine, bromine or iodine or lower alkyl such as methyl, ethyl, propyl or butyl, $R_1$ and $R_2$ may be the same or different and represent lower alkyl such as methyl, ethyl, propyl or butyl; phenyl, phenyl substituted by lower alkyl or halogen, benzyl or benzyl substituted in the aryl moiety by lower alkyl, halogen, lower alkoxy, or nitro and X represents halogen such as chlorine, bromine or iodine.

The cycloheptimidazolinium halides having the aforementioned Formula I are known to possess valuable pharmacological activities. For example, some of these halides possess hypotensive activities and others show antiparasitic activities such as anthelmintic activities for lung worms and common liver flukes.

The aforementioned cycloheptimidazolinium halides (I) have been heretofore prepared by a process which comprises the steps of hydrolysis of the corresponding 2-aminotropone derivatives into the tropolone derivatives, methylation of the latter compounds to form the 2-methoxytropone derivatives, condensation of the latter compounds with guanidine to form the 2-amino-1,3-diazaazulene derivatives, hydrolysis of the latter compounds into the cycloheptimidazol-2(1H)-one derivatives and reaction of the latter compounds with alkyl or aralkyl halides to produce the desired cycloheptimidazolinium halides. [T. Nozoe et al., Scientific Reports of the Tohoku University I, 36, 126 (1952); T. Nozoe et al., Proceedings of the Japan Academy 27, 102 (1951) and ibid. 29, 452 (1953); T. Nozoe et al., Journal of the American Chemical Society 76, 3352 (1954); G. Sunagawa et al., Belgium Patent No. 624,446; and G. Sunagawa et al., the abstracts of the 18th annual meeting of the Japan Pharmaceutical Society, pages 68–69 (Oct. 15, 1963).]

However, such a prior process involves various disadvantages in industrial application, for example, including numerous steps employed and further it is difficult to obtain the desired halides having the above-mentioned Formula I wherein $R_1$ and/or $R_2$ will represent substituted or unsubstituted phenyl group.

As a result of our investigations on the commercially available novel process for the preparation of the aforementioned cycloheptimidazolinium halides, it has now been found that the aforementioned cycloheptimidazolinium halides (I) can be easily produced by reaction of the troponeimine derivatives having the formula

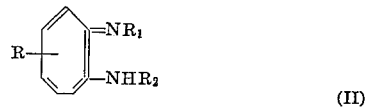

(II)

wherein R, $R_1$ and $R_2$ are as defined above with the halogenoformic acid esters having the formula

  $XCOOR_3$        (III)

wherein $R_3$ represents lower alkyl group such as methyl, ethyl, propyl or butyl and X is as defined above.

It is accordingly, an object of this invention to provide a novel and improved process for the preparation of the aforementioned cycloheptimidazolinium halides (I) which are valuable pharmaceuticals.

Other objects of this invention will be apparent from the following detailed description.

Although the reaction mechanism in the present process is not completely understood, it may be surely considered that a ring-forming reaction will take place between the starting troponeimine and the halogenoformic acid ester. Furthermore, the reaction of the present process is not adversely affected with the presence of the above-specified substituent or substituents in the cycloheptatriene ring of the starting troponeimine (II) and the desired final product may be produced.

In carrying out the process of this invention, the reaction may be preferably conducted in the presence of an inert organic solvent such as, for example, benzene, toluene or dioxane. The reaction temperature is not critical, but it is usual and preferable to carry out the reaction at room temperature or at a reflux temperature of the solvent employed. The reaction period will largely depend upon the reaction temperature, reagents employed and other factors, but the reaction is usually completed for about several hours to 24 hours.

After completion of the reaction, the reaction product may be recovered from the reaction mixture by a known technique, for example, filtration, extraction, recrystallization or any combination thereof.

The starting troponeimine derivatives (II) to be employed in the present process can be easily obtained by a simple procedure involving reaction of the 2-aminotropone derivatives with alkyl sulfates followed by reaction of the resulting product with amines.

The following examples are given for the purpose of illustrating this invention and these examples should not be construed to be limiting the scope thereof.

Example 1

A solution of 3.7 g. of 2-methylamino-N-methyltroponeimine and 6.0 g. of ethyl chloroformate in 80 ml. of benzene was heated at 60° C. with stirring for 15 hours. Thereafter, the crystalline substance which separated was recovered by filtration and then recrystallized from ethanol to give 4.2 g. of 1,3-dimethyl-1,2-dihydro-2-oxocycloheptimidazolinium chloride hemihydrate as white crystals, melting at 247° C. with decomposition.

Example 2

A solution of 4.0 g. of 2-benzylamino-N-benzyltroponeimine and 15.0 g. of ethyl chloroformate in 80 ml. of benzene was heated at 60° C. for 10 hours. Thereafter, the crystalline substance which separated was recovered by filtration, treated with a mixture of chloroform and 5% dilute hydrochloric acid, the crystalline substance was recovered by filtration and then recrystallized from ethanol to give 4.0 g. of 1,3-dibenzyl-1,2-dihydro-2-oxocycloheptimidazolinium chloride as white crystals, melting at 234° C. with decomposition.

Following the same procedure as described above by employing, as a starting troponeimine, 2-(p-toluidino)-N-benzyltroponeimine, there was obtained 1-(p-tolyl)-3-benzyl-1,2-dihydro-2-oxocycloheptimidazolinium chloride (M.P. 225° C. with decomposition).

Example 3

A solution of 5.0 g. of 2-benzylamino-N-benzyl-6-isopropyltroponeimine and 15.0 g. of ethyl chloroformate in 50 ml. of benzene was heated at 60° C. for 15 hours. Thereafter, the reaction mixture was concentrated, the concentrate was extracted with warmed water and then the aqueous layer was concentrated under reduced pressure. The residue was then washed with ethanol, and recrystallized from water to give 1.5 g. of 5-isopropyl-1,3-dibenzyl-1,2-dihydro-2-oxocycloheptimidazolinium chloride, melting at 123° C. with decomposition.

Example 4

A mixture of 5.0 g. of 2-benzylamino-N-(p-chlorobenzyl) troponeimine and 15.0 g. of ethyl chloroformate in 40 ml. of benzene was heated at 70° C. with stirring for 15 hours. After completion of the reaction, the reaction mixture was treated in the same manner as described in Example 2 to give 3.0 g. of 1-benzyl-3-(p-chlorobenzyl)-1,2-dihydro-2 - oxocycloheptimidazolinium chloride trihydrate as crystals, melting at 236° C. with decomposition.

Following the same procedure as described above by employing, as a starting troponeimine, 2-(p-chlorobenzyl)-N-phenyltroponeimine and 2-p-nitroamilino-N-benzyltroponeimine, there was obtained 1-(p-chlorobenzyl)-3-phenyl-1,2-dihydro-2-oxocycloheptimidazolinium chloride (M.P. 237° C. with decomposition) and 1-(p-nitrobenzyl)-3-benzyl-1,2-dihydro-2 - oxocycloheptimidazolinium chloride (M.P. 237° C. with decomposition), respectively.

Example 5

A solution of 3.0 g. of 2-(p-toluidino)-N-(p-tolyl) troponeimine and 3.0 g. of ethyl chloroformate in 50 ml. of benzene was heated at 60° C. with stirring for 10 hours. After completion of the reaction, the reaction mixture was treated in the same manner as described in Example 2 to give 1.0 g. of 1,3-di-(p-tolyl)-1,2-dihydro-2-oxocycloheptimidazolinium chloride as crystals, melting at 261° C. with decomposition.

Following the same procedure as described above by employing, as a starting troponeimine, 2-(p-methylbenzylamino)-N-(p-chlorobenzyl) troponeimine, there was obtained 1-(p-methylbenzyl)-3-(p-chlorobenzyl)-1,2 - dihydro-2-oxocycloheptimidazolinium chloride (M.P. 230° C. with decomposition).

Example 6

A solution of 5.0 g. of 2-(p-chloroanilino)-N-(p-chlorophenyl) troponeimine and 15.0 g. of ethyl chloroformate in 100 ml. of benzene was heated at 70° C. with stirring for 15 hours. After completion of the reaction, the reaction mixture was treated in the same manner as described in Example 2 to give 2.0 g. of 1,3-bis-(p-chlorophenyl)-1,2-dihydro-2-oxocycloheptimidazolinium chloride as white crystals, melting at 241° C. with decomposition.

Example 7

A mixture of 4.0 g. of 2-(p-anisidino)-N-(p-methoxyphenyl) troponeimine and 4.0 g. of ethyl chloroformate in 40 ml. of benzene was refluxed for 7 hours. Thereafter, the crystalline substance which separated was recovered by filtration and recrystallized from aqueous ethanol to give 2.0 g. of 1,3-di-(p-anisyl)-1,2-dihydro-2-oxocycloheptimidazolinium chloride as colorless crystals, melting at 275° C.

Following the same procedure as described above by employing, as a starting troponeimine, 2-(p-anisidino)-N-(p-chlorobenzyl) troponeimine and 2-(p-anisidino)-N-benzyltroponeimine, there was obtained 1-(p-anisyl)-3-(p-chlorobenzyl)-1,2-dihydro-2 - oxocycloheptimidazolinium chloride (M.P. 229° C. with decomposition) and 1-(p-anisyl)-3-benzyl-1,2-dihydro - 2-oxycycloheptimidazolinium chloride (M.P. 229° C. with decomposition), respectively.

Example 8

The same procedure as described in Example 1 was repeated except that 2-benzylamino-N-methyltroponeimine was substituted for 2-methylamino-N-methyltroponeimine and ethyl bromoformate for ethylchloroformate. There was obtained 1-benzyl-3-methyl-1,2-dihydro-2-oxocycloheptimidazolinium bromide (M.P. 249° C.).

What is claimed is:

1. A process for preparing a compound having the formula

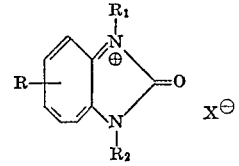

wherein R represents hydrogen, phenyl, halogen or lower alkyl, $R_1$ and $R_2$ may be the same or different and represent lower alkyl, phenyl, phenyl substituted by lower alkyl or halogen, benzyl or benzyl substituted on the aryl moiety by lower alkyl, halogen, lower alkoxy or nitro, and X represents halogen, which comprises reacting a compound having the formula

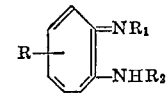

wherein R, $R_1$ and $R_2$ are as defined above with a compound having the formula $$XCOOR_3$$

wherein $R_3$ represents lower alkyl and X is as defined above.

2. A process for preparing 1,3-dibenzyl-1,2-dihydro-2-oxocycloheptimidazolinium chloride which comprises reacting 2-benzylamino-N-benzyl-troponeimine with ethyl chloroformate.

3. A process for preparing 1-(p-tolyl)-3-benzyl-1,2-dihydro-2 - oxocycloheptimidazolinium chloride which comprises reacting 2-(p-toluidino)-N-benzyl-troponeimine with ethyl chloroformate.

4. A process for preparing 1-benzyl-3-(p-chlorobenzyl)-1,2-dihydro-2 - oxocycloheptimidazolinium chloride which comprises reacting 2-benzyl-amino-N-(p-chlorobenzyl) troponeimine with ethyl chloroformate.

5. A process for preparing 1-(p-anisyl)-3-(p-chlorobenzyl)-1,2-dihydro-2 - oxocycloheptimidazolinium chloride which comprises reacting 2-(p-anisidino)-N-(p-chlorobenzyl) troponeimine with ethyl chloroformate.

6. A process for preparing 1-(p-anisyl)-3-benzyl-1,2-dihydro-2 - oxocycloheptimidazolinium chloride which comprises reacting 2-(p-anisidino)-N-benzyltroponeimine with ethyl chloroformate.

References Cited

Brasen et al.: Jour. Amer. Chem. Soc., vol. 83, pp 3125–6, 3130, and 3132 relied on (1961).

Nozoe et al.: Jour. Amer. Chem. Soc., vol. 76, pp. 3352–3 (1954).

Soma et al.: Chem. Pharm. Bull., vol. 13, pp. 819–28 (published July 25, 1965).

HENRY R. JILES, *Primary Examiner.*

N. TROUSOF, *Assistant Examiner.*

U.S. Cl. X.R.

260—566, 999